United States Patent
Arentsen et al.

(10) Patent No.: US 6,641,758 B1
(45) Date of Patent: Nov. 4, 2003

(54) METHOD FOR MANUFACTURING A FOAMED MOULDED BODY FROM A MASS COMPRISING NATURAL POLYMERS AND WATER

(75) Inventors: Jan Hendrik Adolf Arentsen, Lochem (NL); Jan Wietze Huisman, Bellingwolde (NL)

(73) Assignee: Vertis B.V., Veendam (NL)

( * ) Notice: Subject to any disclaimer, the term of this patent is extended or adjusted under 35 U.S.C. 154(b) by 0 days.

(21) Appl. No.: 09/582,736

(22) PCT Filed: Dec. 29, 1998

(86) PCT No.: PCT/NL98/00742

§ 371 (c)(1),
(2), (4) Date: Sep. 25, 2000

(87) PCT Pub. No.: WO99/33629

PCT Pub. Date: Jul. 8, 1999

(30) Foreign Application Priority Data

Dec. 31, 1997 (NL) .............................. 1007945

(51) Int. Cl.[7] .............................. B29C 44/02; B29C 45/00
(52) U.S. Cl. .............................. 264/51; 264/53; 264/328.1
(58) Field of Search .............................. 264/51, 53, 328.1; 425/4 R; 521/84.1

(56) References Cited

U.S. PATENT DOCUMENTS

| | | | |
|---|---|---|---|
| 4,081,557 A | * 3/1978 | Azoulay | 426/52 |
| 4,863,655 A | * 9/1989 | Lacourse et al. | 264/53 |
| 5,102,597 A | * 4/1992 | Roe et al. | 264/126 |
| 5,160,368 A | 11/1992 | Begovich | |
| 6,093,427 A | * 7/2000 | Axelrod | 426/104 |
| 6,251,318 B1 | * 6/2001 | Arentsen et al. | 264/53 |

FOREIGN PATENT DOCUMENTS

| | | |
|---|---|---|
| CH | 679564 A5 | 3/1992 |
| DE | 4211888 A1 | 10/1993 |
| EP | 0346752 A1 | 12/1989 |
| EP | 0474095 A1 | 3/1992 |
| WO | WO 96/30186 | 10/1996 |

* cited by examiner

*Primary Examiner*—Allan R. Kuhns
(74) *Attorney, Agent, or Firm*—Hoffmann & Baron, LLP

(57) ABSTRACT

The invention relates to a method for manufacturing molded bodies having a blown, foamy structure, wherein a mass (S) comprising a suspension of at least starch, starch derivatives or mixtures thereof in water, is pressurized in or through a mold (23) and the mass (S) heated in the mold (23) in a manner such as to give rise to at least cross-linking of the starch, the starch derivatives or the mixture thereof wherein the mass (S) in the mold (23) is brought at least to the baking temperature, wherein the suspension is at least partially prepared from vegetable material which has not been subjected to an artificial drying step and which, calculated on the dry substance, contains at least 50 wt. % of starch, said vegetable material at least being ground to particles of a suspendable size. The invention further relates to the use of ground vegetable material, which vegetable material has not been subjected to an artificial drying step and, calculated on the dry substance, contains at least 50 wt. % of starch, said vegetable material being ground to particles of a suspendable size, in a mass subjected to a thermal molding step under pressure, for effecting a faster and more homogeneous gelatinization. The invention moreover relates to apparatus (20) for manufacturing molded bodies having a foamed structure.

7 Claims, 3 Drawing Sheets

METHOD FOR MANUFACTURING A FOAMED MOULDED BODY FROM A MASS COMPRISING NATURAL POLYMERS AND WATER

The invention resides in the field of molded bodies manufactured from a mass comprising at least natural polymers, and in particular starch, and water.

The molded bodies have a blown, foamy structure. More particularly, the foamy material always comprises at least three parts: two relatively dense layers on the outside, which as it were form a skin, and between them a foam structure as core layer. The dense layers are firm and strong and consist of substantially closed, small cells. The foam structure of the core is generally open; the cells have burst to allow the gases evolving during the manufacture, for instance water vapor or carbon dioxide, to escape. Generally, the cells have a firm and solid cell wall due to the relatively high pressure and temperature in the mold or die during the manufacturing process.

These products can be manufactured in many manners, for instance according to the methods described in WO-A-95/20628, NL-A-1004138 and WO-A-96/30186.

These known methods start from a mass or batter which substantially consists of a mixture of modified or non-modified biopolymers, and particularly starch, and water, to which processing aids and additives for influencing the properties of the finished product are added. This has advantages particularly if fibrous material is added thereto to increase the dimensional stability and reinforce the finished product.

Generally, such batters comprise, for instance, 500–1500 parts by weight of starch or starch derivatives, 0.5–50 parts by weight of xanthan gum, 5–250 parts by weight of a reactive siloxane and 0–300 parts by weight of an inert filler in water. Additionally, preferably 0.5–50 parts by weight of a salt are further included, and 0–25 wt. % of fibers calculated on the weight of the complete batter mass.

The above embodiments are applicable for the present invention, yet should not be construed as being limitative in this context. Other batter compositions on the basis of water and natural polymers, in particular starch or starch derivatives, can likewise be used. In this respect, it is within the scope of a skilled artisan to set optimum processing conditions, such as pressure, temperature and residence time, depending on the batter and the molding apparatus to be used and within the framework of the invention.

In the known methods used for forming foamed molded bodies to which the present invention is directed, a starch or starch derivative is in each case used, in practice.

Starch is usually obtained from crops having a high starch content, in particular from cereals, including rice and maize, and from potatoes. The parts of these vegetable sources that possess high starch contents are washed and subsequently ground. From the ground plant parts, the protein fraction can then be separated, when necessary. After that, the starch granules are separated from fibrous material present and from other impurities by means of, for instance, sieves and/or hydrocyclones. This so-called starch refining requires much water. The obtained and washed starch granules are subsequently dehydrated with a vacuum filter and dried with hot air of, for instance, about 120° C.

When the molded bodies are not intended for consumption, relatively crude starch may usually suffice.

European patent application 0 474 095 concerns a method wherein starch-containing natural products are used in starting substances of molded bodies. For starch-containing fruits and potatoes, a pre-drying step is preferably used. Next, a pre-heating step is performed which, depending on the water content, takes place at a temperature below the glass transition temperature or at a temperature above 80–90° C. This results in the formation of a plastic or gelatinized product which can subsequently be shaped.

Nowhere, a link is made between a faster and more homogeneous gelatinization and the use of undried, crude vegetable material. Further, no reference is made to the removal of protein-containing material and/or salt so as to limit the disadvantageous influence during the baking process in the mold.

DE-OS-42 11 888 describes molded bodies manufactured from dough or batter prepared from complete plants. The use of only plant parts that have a starch content of at least 50 wt. % calculated on the dry substance and the advantages involved is neither described, nor suggested, and neither is the separation of protein and salt.

It is an object of the present invention to further optimize the method for manufacturing molded bodies on the basis of natural polymers, in particular starch and/or starch derivatives. In particular, there is a need for a method in which the required gelatinization can be performed more quickly and preferably more homogeneously. Moreover, there is a need for a method in which, if additives are used for improving the properties of the finished end product, such as cross-linking agents, these additives are distributed more properly, in particular more homogeneously, between the different starch chains. A further object is to cause the baking process to proceed in a more controlled manner.

Surprisingly, these objectives can be accomplished by applying in the batter starch that has not been subjected to a drying step.

More in particular, the invention relates to a method for manufacturing a molded body having a blown, foamy structure, wherein a mass comprising a suspension of at least starch, starch derivatives or mixtures thereof in water, is pressurized in or through a mold and the mass is heated in the mold in a manner such as to give rise to at least cross-linking of the starch, the starch derivatives or the mixture thereof, wherein the mass in the mold is brought at least to the baking temperature, characterized in that the suspension is prepared from vegetable material which has not been subjected to an artificial drying step and which contains at least 50 wt. % of starch, calculated on the dry substance, which vegetable material is ground to particles of a suspendable size.

In addition, the invention relates to the use of ground vegetable material, which vegetable material has not been subjected to an artificial drying step and which contains at least 50 wt. % of starch, calculated on the dry substance, which vegetable material is ground into particles of a suspendable size, in a mass subjected to a thermal molding step under pressure, to effect a quicker and more homogeneous gelatinization.

Further, the invention relates to the application in which, further, at least one additive for improving the properties of the product to be formed is added to the mass, to obtain a homogeneous distribution of the additive in and between the starch chains of the vegetable material that has not been subjected to an artificial drying step. Via this application, in particular, better reaction possibilities for the additives are created.

In this description, "gelatinization" is understood to mean a change of starch and/or starch derivative from a slightly or completely loose granular or comparable granulate form into a form in which stretched starch and/or starch derivative chains are present, which chains are interconnected only slightly, if at all. That is to say, there occurs a transition of starch or starch derivative from a solid form, a colloidal solution or suspension to a more homogeneous fluid mass. In this description, the term "gelatinizing" is synonymous to terms like "gelling", "gellating" and the like.

In this description, by "baking" is understood to mean a method in which both gelatinization and cross-linking occur, at relatively high temperature and/or pressure. As a result, the formation of gas arises relatively soon, so that bubbles are already formed prior to or during gelatinization. Due to inter alia the high pressure adjacent strongly heated parts, the polymers cross-link quickly when using a mold or like baking form with a temperature at or above the baking temperature.

These baked products have a core with relatively large cells, enclosed between skin parts with relatively small cells. The cell walls have a relatively high density. Such a baked product therefore has a sandwich-like structure.

In accordance with the invention, in the batter which, according to otherwise known methods, can be formed into a foamed end product, ground vegetable product is applied as at least a part of the required starch source. The vegetable products to be ground are products directly obtained from nature and have a relatively high starch content. More in particular, these products should have a starch content of at least 50 wt. %, preferably at least 60 wt. %, and more preferably at least 70 wt. %, calculated on the dry substance.

Examples of such vegetable products are starch-containing tubers and roots, seeds, fruits and grasses. More specifically, potatoes, tapioca, sweet potatoes, arrowroot, sorghum, waxy sorghum, cereals, rice, maize, sago, canna, pulses like peas, beans and lentils, unripe fruits such as apples and green tomatoes, and bananas.

In the following diagram, a number of supplementary data in respect of a number of highly preferred starch sources are given (in percents):

| Type | starch | moisture | protein | lipides | fibers |
| --- | --- | --- | --- | --- | --- |
| potato | 17 | 78 | 2 | 0.1 | 1 |
| maize | 60 | 16 | 9 | 4 | 2 |
| wheat | 64 | 14 | 13 | 2 | 3 |
| tapioca | 26 | 66 | 1 | 0.3 | 1 |
| waxy maize | 57 | 20 | 11 | 5 | 2 |

It is important that the above vegetable products be subjected to an artificial drying step only to a highly limited extent, if at all, which means that these vegetable products are substantially ground in the condition in which they are obtained in nature or, optionally, in the condition in which they are dried on the air, possibly in coarse pieces, yet in unground form.

Without wishing to be bound to any specific theoretical explanation, it is assumed that the use of suspendably ground vegetable products as starch source yields the advantages according to the invention, because in this form, the starch granules are practically undamaged and the separate starch chains are in undisturbed equilibrium with water. More in detail, it is assumed that when starch is obtained from said vegetable sources in a more refined form, starch granules shrink and the pore volume in the granules decreases during the required drying steps. In particular, a dried skin is formed on the outside of the dried starch granules. This involves hydrogen bridges between water molecules and starch chains as they are found in the natural cell environment being at least partially broken and converted into starch-starch interactions.

When dried crude starch, which, when exposed to the atmosphere, usually still contains 15–25 wt. % of moisture, is introduced into an aqueous medium, water molecules can penetrate into the granules slowly and to a limited extent, mainly because the pore volume in the dry granules is relatively low, while below the gelatinization temperature, which is about 55° C., the starch-starch interactions formed through drying substantially do not break.

When after obtaining, the starch is refined first, the water-absorbing capacity is limited even further. Indeed, the refining involves an exchange between naturally present monovalent sodium and potassium ions and bivalent ions present in hard water, in particular calcium and magnesium ions. This exchange, which is in fact a displacement, causes a physical cross-linkage between the separate starch granules, which cross-linkage impedes the swelling of the granules.

Both above-mentioned cross-linking effects, viz. the starch-starch interactions in the granules and the cross-linking of individual granules relative to each other due to the presence of bivalent ions, give the starch granules a configuration or structure that swells with difficulty, while the gelatinization of the granules is moreover slowed down. However, as in the method according to the invention, only a short (reaction) time is available in the mold, particularly in processes on an industrial scale, it is highly important to limit these physical cross-linking effects as much as possible.

In the method according to the invention, the above physical cross-linking effects substantially do not play a part, because the starch granules are located in an optimum aqueous medium, viz. the natural water environment.

This water environment enables a fast gelatinization. After gelatinization, the individual starch chains are properly accessible, which enables the derivatization reactions on the starch chains to be performed highly homogeneously in the mold. In this manner, a highly homogeneously derivatized product can be obtained, which is not possible with a starch subjected to a drying step and/or a refined starch, because of the reduction of the pore volume and the formation of a dried skin during the drying steps necessary for obtaining starch. There, reagents can substantially only contact the outside of the granules.

More in particular, during derivatization in the mold with a starch subjected to a drying step and/or a refined starch, which therefore possesses a large number of physical cross-links, the gelatinization may occur too slowly, so that a derivatization reaction may take place before the gelatinization is complete. As a consequence, the reagents substantially only contact the outside of the partially gelatinized granule. Moreover, the derivatization reaction which is already in process may impede the further gelatinization.

Also when a priorly prepared derivative is added to the batter suspension, no homogeneous product is obtained. In that case, the reaction during the derivatization prior to use in the mass occurs particularly in the outer skin of the starch granules. Thus, for instance for the specific derivatization for forming cross-links, a priorly made cross-linked derivative has bindings only-between starch chains at granular level, while specific groups will moreover be coupled only to the outside. After eventual gelatinization of such derivatives in the mold, no homogeneously cross-linked and/or derivatized product results.

As mentioned hereinabove, in the method according to the invention, it is possible to cause a derivatization reaction to take place homogeneously in the mold.

Derivatization reactions that can suitably be performed in the method according to the invention are, for instance, the provision of reactive cross-linkable groups, esterification reactions, such as acetylation reactions utilizing acetic acid anhydride and adipic acid, and etherification reactions, such as benzylation reactions utilizing $C_6H_5CH_2Cl$, which reactions yield a more hydrophobic product. The required quantities depend on the starch type to be derivatized, the type of derivative, the intended object and the apparatus whereby the molded bodies according to the invention are manufactured. This can be experimentally determined by a skilled person in a simple manner.

An essential step in the method according to the invention is the grinding of the starch-containing vegetable raw materials. These grindings can be performed in any industrially applicable grinding machine for this type of raw materials, to a grinding degree which yields a product that can substantially be suspended. This can be experimentally determined by a skilled person in a simple manner.

Typically, grinding involves the formation of a suspension which sags when it is let stand for a while, for instance 1 hour. The supernatant mainly consists of water containing a number of water-soluble compounds, and in particular water-soluble protein and salts. It is advantageous to substantially remove this water with the compounds dissolved therein utilizing a known technique, such as decanting, centrifuging and filtering. Thus, in particular protein and salt, which may usually have an adverse effect on the baking process in the mold, can be removed.

Accordingly, a preferred embodiment of the method or use of the invention is characterized in that after grinding, the suspension formed is allowed to sag, after which the supernatant thus formed is removed at least partially, for instance for more than 50 vol. %, preferably for more than 80 vol. %, and possibly completely.

Generally and advantageously, a quantity of fibrous material will already be present the ground substance fraction.

A further object of the invention is to provide an apparatus for the manufacture of foamed products, in which the supply of the starting materials is simple, in which the manufactured products are simple to remove from the mold, which allows a relatively great freedom of design and in which the manufactured products have a good dimensional stability and exhibit relatively good resistance to different conditions, including moist environments and temperature fluctuations, which products can moreover be integrated into a (paper) reuse flow ((paper) recycling). To that end, an apparatus according to the invention is characterized by the presence of at least one forming mold and at least one apparatus for cutting up and/or grinding the vegetable material, means being provided for making a mass from at least the cut up or ground natural plants and feeding the mass into or through the at least one mold; or by the presence of at least one mold having at least one mold cavity and supply means for supplying a biopolymer, in particular starch-containing mass, into the or each mold cavity, while adjacent the supply means, feed means are provided for introducing additives into the mass directly before or during the supply of the mass into the at least one mold, in particular agents suitable for entering, in the mold, into chemical and/or physical reactions with components of the mass; or by the presence of at least one mold having at least one extrusion orifice and supply means for supplying a biopolymer, in particular starch-containing mass, into the at least one extrusion orifice, while adjacent the supply means, feed means are provided for introducing additives into the mass directly before or during the supply of the mass into the at least one extrusion orifice, in particular agents suitable for entering, in the mold, into chemical and/or physical reactions with components of the mass.

In this application, mold, should at least be understood to include platen sets, baking molds, injection-molds, extrusion molds and compression molds.

Owing to the supply of the mass from which the or each product is to be formed, preferably at a temperature which is below the gelatinization temperature, the supply of the mass can be realized in a simple manner, for instance via pumps and pipes. Moreover, a stock of the mass can be priorly prepared and be fed to a processing apparatus directly from a storage tank. By subsequently passing the mass under pressure into or through the mold and only heating it in the mold, it is ensured that the mold is always filled sufficiently. The flow path, i.e. the or each path traversed by the mass to and in the mold, can then be long to very long with respect to the cross sections of the passages. Only in the mold, the eventual gelatinization of the natural polymers occurs and then cross-linking of those polymers.

The feed of additives, for instance reagents for derivatization reactions, in or adjacent the supply means, offers the advantage that any chemical and/or physical reactions between the mass and the additives take place only at a late stage, for instance only in the mold. As a result, derivatization can for instance occur in the mold, with the mold acting as reactor vessel. Moreover, this permits the flow properties of the mass to be maintained.

Due to the cross-linking that occurs, a firm product is obtained. The natural polymer, in particular the starch, provides for a relatively firm skeleton extending around preferably continuous cells that form in the mold due to moisture or another blowing agent which, as a result of the heat in the mold, attempts to escape from the mass and forms bubbles caused by the pressure in the mold. As a result, the product obtained has a blown foamy structure. Since the natural polymer provides for a relatively stiff jacket, the thus obtained product is dimensionally stable upon exiting from the mold. Depending inter alia on the extent of cross-linkage, the product obtained is more or less flexible.

Since the mold is heated and not the mass prior to it being introduced into the mold, the temperatures in the mold can be properly controlled, both for the mold as a whole and for each separate portion thereof. As a result, products can be manufactured with different and varying wall thicknesses and with different mechanical properties. In fact, by heating more or less and/or for a longer or shorter period and adjusting, for instance, the pressure, for instance the extent of cross-linkage of the polymers can be controlled locally, so that the mechanical and physical properties are influenced. This can be determined by a skilled person in a simple manner.

Heating the mass up to baking temperature, hence in excess of 100° C., offers the advantage that the occurrence of fungoid growth is prevented or at least substantially decelerated.

The products obtained with a method according to the invention are relatively strong and compression-resistant, shock-proof and relatively elastic, insulating and can be reduced without involving fragmentation. After use, the products can be incorporated into an existing waste flow for, for instance, composting or, more advantageously, into a paper-recycling flow.

In this respect, the presence and/or addition of fibers, in particular natural fibers, offers the advantage that the products are more dimensionally stable after being manufactured and remain form-retaining, and also under moist conditions can have an increased tear-resistance, strength and flexibility.

By using natural fibers in products according to the invention, in particular fibers of, for instance, annual crops and/or recycled fibers such as cellulose fibers from paper and wood waste, significant advantages in terms of environment and manufacture are achieved. For instance, the emission of harmful substances is reduced, if not prevented, both during the manufacture and during the waste processing. Since no fossil resources are used in the products, the waste processing thereof will not cause any permanent $CO_2$ increase in the atmosphere, so that these products do not contribute to the so-called hothouse effect.

A further significant advantage achieved through the addition of the fibers is that the resulting product retains its original shape and properties longer than it does without fibers. Although composting, i.e. the biological degradation process, proceeds relatively slowly, which renders the product less suitable for incorporation into a flow of vegetable, fruit and garden refuse, the product is thus sufficiently durable for serving, for instance, as packaging material, also if the articles packaged therein are for instance stored for a long period and/or are sent, or under unfavorable conditions, such as high temperature and/or high air humidity. Upon further preservation, products manufactured according to the invention are suitable as construction elements, building parts and the like. These products are durable, light, moldable, insulating and have a sandwich construction.

In filling batter compositions known from the prior art, inert fillers may be incorporated. According to the present invention, it has been found that it is advantageous to select the content of inert fillers to be lower than 50 wt. %, in particular lower than 20 wt. % and preferably lower than 15 wt %, calculated on the total weight of the batter. At higher contents of inert fillers, contamination of the mold occurs and the resistance to moisture may be reduced.

A product manufactured in accordance with the invention is generally self-extinguishing, while comparable products manufactured from, for instance, (paper) pulp are relatively combustible. Moreover, the manufacture of such pulp products is labor-intensive and costly, the products are less strong, heavy, little resistant to, for instance, high temperatures and moisture, and exhibit little freedom of design. A number of these and comparable drawbacks occur with comparable products manufactured from plastic such as polystyrene, foam and the like.

Further, a product obtained from the method or use according to the invention-has the advantage that it causes no problems in respect of static load, so that in particular electronic components and other charge-sensitive products can very suitably be packaged in products according to the invention.

The invention further relates to the use of an injection molding apparatus or extrusion apparatus for manufacturing foamed products and to products manufactured according to the invention.

Further advantageous embodiments of the invention are given in the subclaims.

BRIEF DESCRIPTION OF THE DRAWINGS

To clarify the invention, exemplary embodiments will be described hereinafter, with reference to the accompanying drawings. In these drawings.

DETAILED DESCRIPTION OF THE INVENTION

Figure 1:
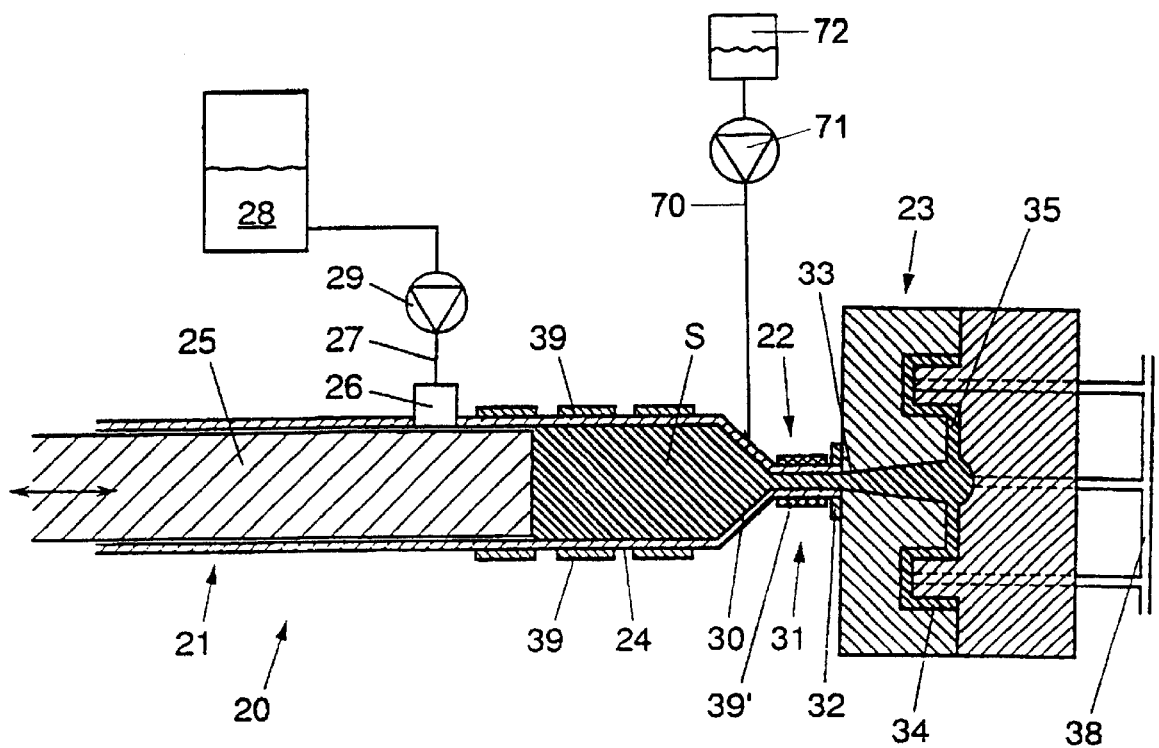
FIG. 1 schematically shows in cross-sectional side view an injection molding apparatus according to the invention.

In this specification, corresponding parts have corresponding reference numerals.

FIG. 1 shows an injection molding apparatus according to the invention, which, as far as construction is concerned, is described in more detail in Dutch patent application 1004138 and international patent publication WO 96/30186, which documents are incorporated herein by reference. The injection molding apparatus 20 comprises a supply device 21 for a batter S, connecting to a mold 23 via a spray nozzle 22. The batter S is for instance fed from a storage tank 28 into the supply device 21 by means of a pump 29. Via a thermally separating connecting piece 32, the supply device 21 connects to a gate 33 of the mold 23.

Adjacent the thermally separating connecting piece 32, at least adjacent the gate 33, a line 70 connects to the supply device, which line 70 communicates with a storage tank 72 with the interposition of pump means 71, in which storage tank 72 additives such as processing aids and reagents for derivatization reactions are stored. Directly before or during the feed of the mass S into the mold 23 by means of the supply device 21, the additives can be fed, by the pump means 71, from the storage tank 72 to the mass S and incorporated therein, in order to be fed into the mold 23.

Figure 2:
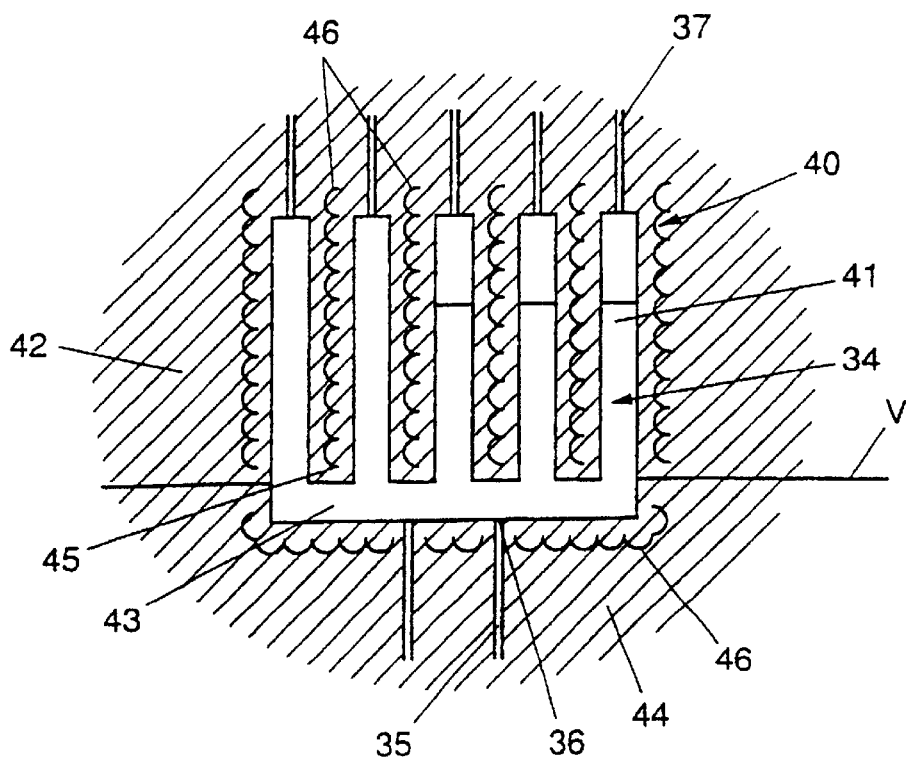
FIG. 2 shows on an enlarged scale a part of a mold, with mold cavity, in cross-sectional view.

Provided in the mold 23 are a number of mold cavities 34, as shown in particular in FIG. 2. By specific heating means 40, the mass S in the mold cavities 34 can be heated so that gelatinization of the natural polymers in the mass, in particular the starch, occurs and the mass is subsequently baked. This will moreover involve chemical and/or physical reactions between components of the mass S and the additives added thereto, for instance for the formation of starch derivatives, changed chain structures and the like. The mold in fact functions as a reaction vessel, in which, through specific control of the temperature in the mold 23 by means of the heating means 40, the different reactions can be accurately controlled. Thus, coatings can for instance also be provided on the skin 13, while depending on the additives selected, all kinds of different product properties can be influenced, such as elongation, impact-resistance, compostability, hardness, cell structure, specific weight, chemical resistance, colorfastness and the like.

The mass S is preferably a solution or suspension, in particular a suspension of starch or one or more of such natural polymers, in which fibers, in particular fibers of annual crops and/or recycled fibers, for instance cellulose from paper, cardboard or wood waste in water may be added. It is also possible to start from relatively dry starting material, for instance granulate, and other compositions may be applied as well. Optionally, a part of the mass may be slightly pre-foamed. Suitable compositions of a mass S are given in, inter alia, the above-cited Dutch patent application 1004138 and international patent publication WO 96/30186, incorporated herein by reference.

Figure 6:
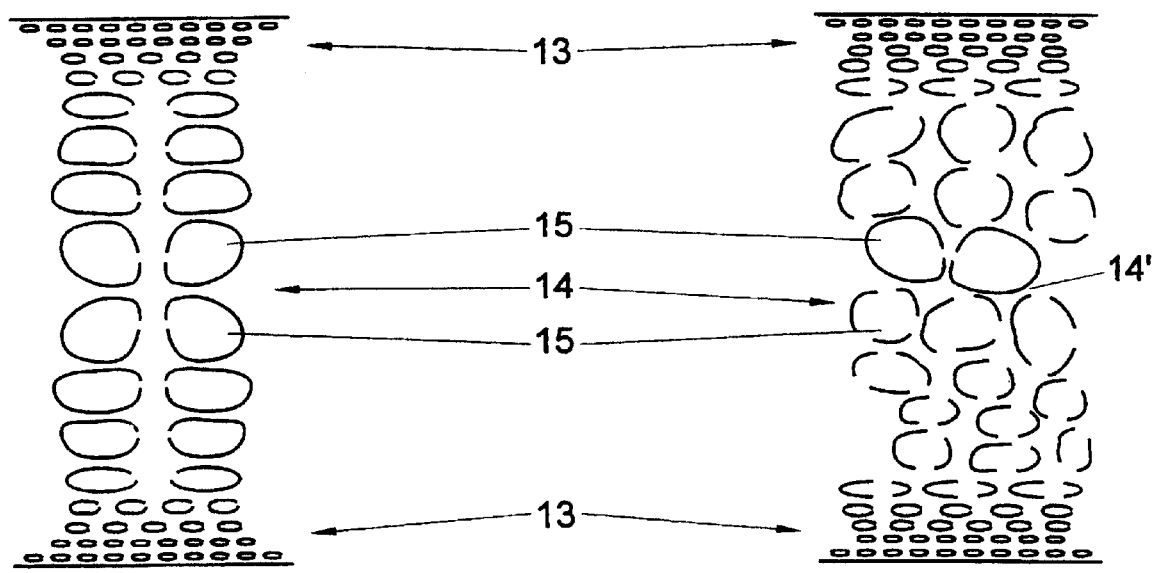
FIG. 6 schematically shows twice a cross section of a wall of a product manufactured according to invention, without fibers.
Figure 7:
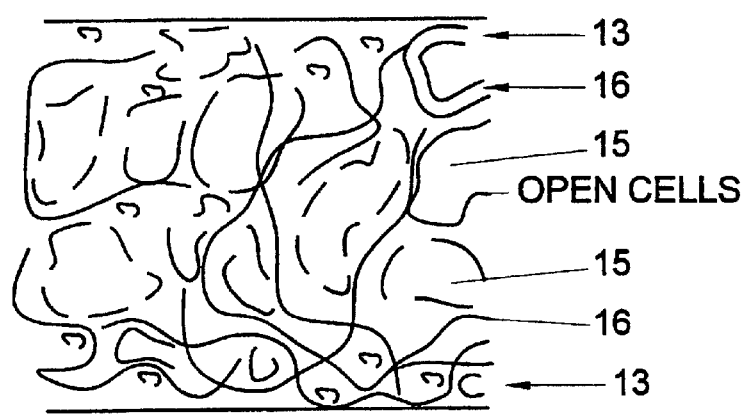
FIG. 7 shows a cross section of a wall of a product manufactured according to the invention, with fibers.

The injection-molded product has an at least substantially closed skin 13 of closed cells and a foamy core 14 comprising open cells 15. FIG. 6 schematically shows on an enlarged scale a cross section through a wall part of a product according to FIG. 3 or 4. In this embodiment, no fibers have been added to the mass S, while the selected starting materials do not contain any fibers, either. In this embodiment, the products are particularly well biodegradable. In the embodiment shown in FIG. 7, fibers 16 are included in the mold, which fibers may extend within the wall of the product with a relatively arbitrary orientation. Each fiber 16 is in contact with a series of cells in the skin 13 and/or the core 14. Thus, the wall can obtain a relatively high bending and tensile strength. Moreover, at an overload, the wall can tear without directly involving breaking. That is to say, at an overload, the different parts of the product remain interconnected, such that no fragmentation occurs. This prevents large quantities of loose, small waste parts. The product can nevertheless be readily reduced through flattening, so that as waste, the product occupies relatively little space.

The skin is dimensionally stable, which enables for instance printing, as well as embossing by means of the or each mold cavity.

At a suitable ratio between the volume of the mass required for the manufacture of a product to be obtained and the outside dimensions thereof, other methods, known per se, can be used as well within the framework of the present invention, such as for instance a compression molding technique or platen sets in continuous furnaces or stationary furnaces. Such methods are generally known from practice.

Figure 3:
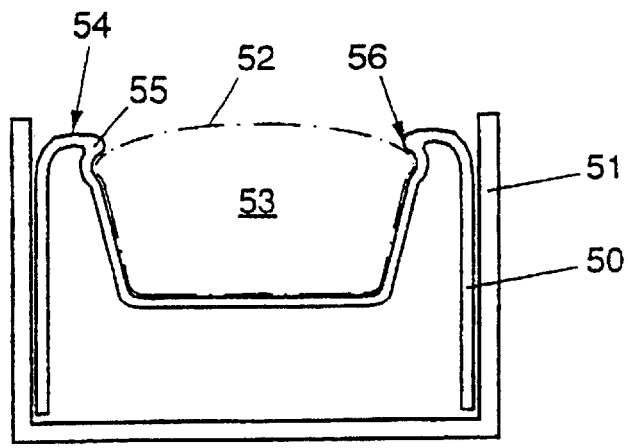
FIG. 3 shows a product, in particular an inner tray and an outer box, for instance manufactured by injection molding, in cross section.

FIG. 3 shows a cross section of an inner tray 50 in a storage box 51, in which inner tray 50 for instance a household appliance 52 can be stored. The inner tray 50 is dish-shaped, i.e. at least for the most part thin-walled, and has a receiving cavity 53. Situated adjacent the upper edges 54 of the receiving cavity 53, on opposite sides, is a clamping projection 55 which is formed integrally therewith and has an undercut 56 under which the appliance 52, shown in broken lines, can be pressed down. The inner tray has been formed by injection molding, utilizing a divisible core. In this manner, the clamping projections 55 can be integrally injection molded. Accordingly, the method according to the invention also enables the manufacture of non-withdrawable products in one processing pass, which renders such products particularly suitable, for instance as packaging material, storage material and the like, but also as filling material, for instance for sandwich-shaped construction parts, for housings and the like.

The inner tray 50 and the storage box 51, which is for instance manufactured as exterior package from cardboard, can together be incorporated into the paper recycle flow, so that the total package can be regarded as monomaterial package.

Figure 4:
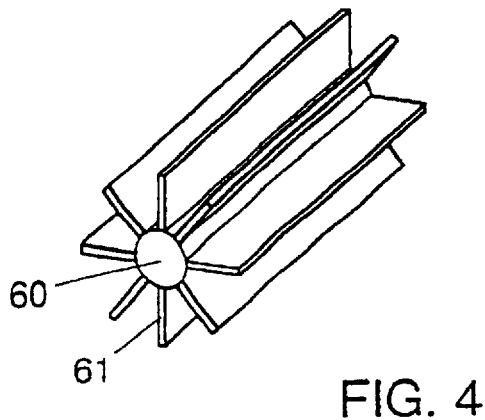
FIG. 4 shows a product manufactured by extrusion, in perspective view.

FIG. 4 shows a filler product 60, in the form of a so-called "loose fill material", a filler product 60 which is used for packaging products in a shock-absorbing manner in, for instance, boxes, cases, crates or like packages. To that end, a multiplicity of the filler products 60 are loosely poured into the interspace between a product (or products) to be packaged and the package; after which the package can be closed and movements of the packaged product within the package are prevented or at least taken up in a shock-absorbing manner. For that purpose, the loose fill material is slightly elastically deformable.

The filler product 60 as shown in FIG. 4 comprises an approximately cylindrical core 61 and a number of fins 62 extending approximately radially from the core, and which extend throughout the length of the core. The fins are relatively thin with respect to their height and length, so that they exhibit a measure of bending slackness. The circumference of the filler product 60, measured along the tops of the fins 62, is largely determinative of the volume the filler product occupies, so that a favorable volume-to-weight ratio is obtained.

Figure 5:
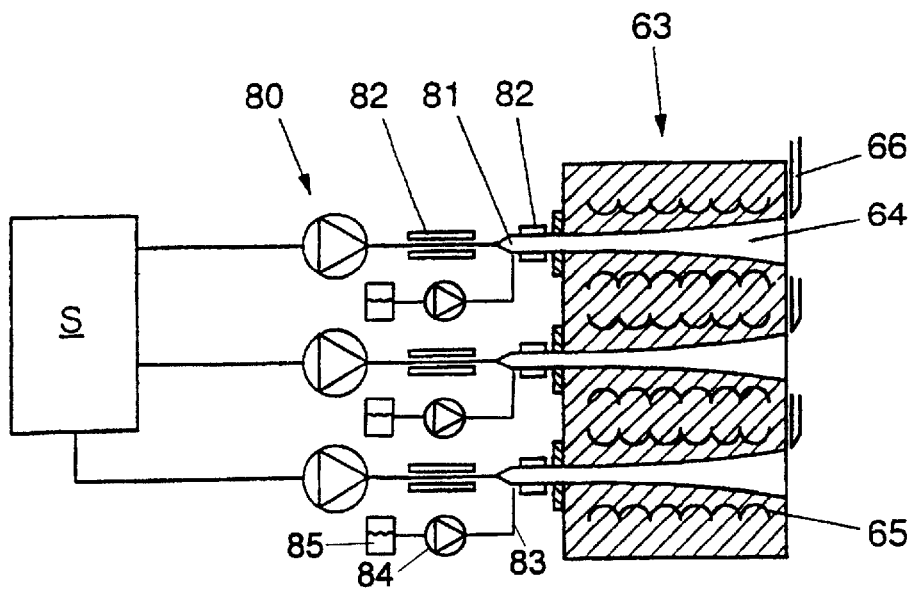
FIG. 5 schematically shows in cross-sectional view an extrusion apparatus according to the invention.

The filler products according to FIG. 4 and similar for instance lengthwise symmetrical products can be formed by extrusion on an apparatus according to FIG. 5. The extrusion apparatus comprises a supply device having means 80 for the (semi-)continuous pressurized supply of batter S or a granulate-form mass M, whether or not pre-foamed to some extent, from a storage tank to a spray nozzle 81, for instance utilizing one or more pumps. Connecting to the spray nozzle 81 in this extrusion apparatus is an extrusion die 63 which comprises one or more extrusion orifices 64 of a cross section which substantially corresponds or is at least similar in shape to the cross section of the filler product to be obtained. The supply device 80, and in particular the spray nozzle 81, comprises cooling means 82, for instance as described in the foregoing. Adjacent the spray nozzle 81, a line 83 connects, which line is connected, via pump means 84, to a storage tank 85 for processing aids or other additives. During the feed of the mass S into the extrusion die, which mass, as described hereinabove, may be fluid, granular but also dough-shaped, additives from the storage tank 85 may also be admixed by means of the pump means 84, for reacting with components of the mass S in the extrusion die. With this, the above-described advantages in respect of the injection molding apparatus can be realized.

The extrusion die comprises heating means 65, provided such that at least in the extrusion orifices, the temperature can be accurately controlled, for instance to 210–255° C. Arranged on the side of the extrusion die 63 remote from the supply device 80 is a cutter 66 by which extruded sections can be cut into short lengths upon exiting from the extrusion orifices.

The invention will now be further elaborated with reference to the following, non-limitative examples.

EXAMPLE 1

Compression Molding 4700 g industrial potatoes were ground with a Braun kitchen machine. The pulp was subsequently thickened to 38% dry substance with a centrifuge, whereby apart from water, a large part of the protein was removed. To the thickened pulp (which contained about 940 g starch), 20 g silicone HY oil, 170 g calcium carbonate (Hydrocarb 90), 75 g recycled cellulose (75% short fibers, 15% filler and 10% fiber binders) and 5 g of the binding agent xanthan gum (Keltrol F) was added, with intensive mixing. By intensive mixing, a homogeneous batter was obtained.

This batter was introduced into the supply device of a compression molding machine. This machine contained a mold having 10 mold cavities for molding products, each product having a size of 240×110×45 mm (L×W×H) and a wall thickness of 1.5 mm. The mold comprised electric heating elements. The mold temperature was 210° C., with a temperature tolerance of 5° C. The mold was positioned in horizontal direction in such a manner that dosing of the batter could take place in the bowl-shaped parts. Dosing took place by disposing a dosing unit between the mold parts and subsequently dosing, for 2 s, about 42 cc batter of about 100C into each mold cavity. After the removal of the dosing unit, the mold was closed and kept closed for 40 seconds at a force of 35 kN per mold cavity. During these 40 seconds, the mold was maintained at the required temperature, in the first 10 s, each mold cavity was entirely filled with foamed product. During heating, 98% of the water escaped, substantially in the form of vapor, via vents in the mold; this water functioned as blowing agent. After opening of the mold, the molded products were removed from the mold by placing a removing member between the mold halves and picking up the products by vacuum. After withdrawal of the removing member with the products, the machine was ready for the next cycle, the total cycle period was 60 seconds. The thus formed products were directly ready for use. Each product had a core of about 1.1 mm and on either side a skin of 0.2 mm. Each product had a weight of about 13 g and a density of about 140 g/l. The obtained product was firm, form-retaining and had a smooth surface. After use, the material can be processed in the paper-recycle flow, and is also biodegradable for instance by composting.

EXAMPLE 2

Injection Molding

This example indicates that a form-retaining foamy product can be made from a non-refined raw material by applying the injection molding technique. The homogeneous batter as prepared in Example 1 was introduced into the supply device of an injection molding machine. The injection molding machine used is of the type EPS-10, of the firm Thermoware of Barneveld. This machine comprised a mold with 10 mold cavities for molding the products, each product having a size of 240×110×45 mm (L×W×H) and a wall thickness of 1.5 mm. In this machine, the mold was in vertical position. The injection molding machine comprised electric heating elements and a plunger injection device with a shut-off thermally uncoupled from the mold. After the closing of the mold, about 42 cc batter was dosed per mold cavity, under a pressure of 1.5 bar and at a temperature of 10° C. The mold temperature was 220° C., with a temperature tolerance of 50C. The mold was maintained at the required temperature during the complete cycle. From the moment of injection, the mold was kept closed for 25 seconds at a force of 35 kN per mold cavity. In the first 8 seconds, each mold cavity was filled entirely with foamed product. During heating, 98% of the water escaped, substantially in the form of vapor, via vents in the mold; this water functioned as blowing agent.

After 27 seconds, the mold was opened and the injection-molded products were blown from the mold by compressed air. The total cycle period was 33 seconds. The thus formed products were directly ready for use. Each product had a core layer of about 1.1 mm thickness and on either side a skin of 0.2 mm. Each product had a weight of about 13 g and a density of about 140 g/l. The obtained product was firm, form-retaining and had a smooth surface.

After use, the material can be processed in the paper-recycle flow, and is also biodegradable for instance by composting.

EXAMPLE 3

Injection Molding With Cross-linking

In this-method, 3000 g potato was ground and thickened to 40% dry substance. To this, 590 g mains water was added and next, the pH was brought to 9.5 by sodium hydroxide. Under intensive mixing, the following components were added: 400 g starch (Avebe-food grade), 250 g kaolin (china clay spec), 90 g cellulose (from softwood, fiber length 2.5 mm, white), 5 g binding agent xanthan gum (Keltrol F) and 10 g calcium stearate. The mixture was stirred intensively until a homogeneously smooth raw material was obtained. Next, 21 g sodium trimetaphosphate was stirred through the batter.

This batter was processed as in Example 2, but now into a product having a thickness of 3 mm. The mold was set at 200° C. and was kept closed for 92 seconds. The injection volume was 75 cc at a pressure of 3 bar.

This resulted in a product of 27 g, whose dimensional stability was much better than that of the product of Example 2. Sodium trimetaphosphate provides bindings between the different starch chains (cross-links), which account for this increased dimensional stability. By causing the reaction with sodium trimetaphosphate to take place in the mold, the cross-linking is homogeneously present throughout the product. On the other hand, when in the injection molding material, the starch is already initially present in cross-linked condition, a product having an inhomogeneous cross-link distribution is obtained. The recyclability in paper, and the biodegradability of the product obtained according to the invention, were ensured.

EXAMPLE 4

1700 g maize was ground. To the resulting pulp, 1900 g mains water was added, in which 25 g silicone HY oil was mixed in advance. Next, 75 g Hydrocarb 90, 75 kaolin (china clay specs) and 120 g recycled cellulose (in conformity with Example 1) and 15 g Keltrol F were added.

The mixture was processed as in Example 2, the injection volume being 50 cc at an injection pressure of 3 bar. As mold temperature, 190° C. was used, for a cycle period of 65 seconds. A product of about 18 g was obtained. The product has a strength which is comparable with, yet a water resistance which is slightly lower than that of the product obtained according to Example 2.

EXAMPLE 5

3000 g potato and 500 g maize were ground and thickened with a centrifuge to 40% dry substance. This pulp, which contained about 900 g starch, was subsequently mixed for about 10 minutes with 1000 g mains water and then centrifuged again to 40% dry substance. With this, a large part of the contaminations that could disturb derivatization in the mold were removed. Next, 200 g water, 300 g Hydrocarb 90, 100 g cellulose (as in Example 3), 7 g binding agent xanthan gum (Keltrol F), and 10 g calcium stearates was added to this. Directly before the mass was injected into the mold, 40 g urea formaldehyde, about 1 g per product, was added to the mass, via an additional inlet opening.

The mixture was processed as in Example 2, while the injection volume was 90 cc at an injection pressure of 3 bar and the thickness of the product was 3 mm. As mold temperature, 225° C. was used, for a cycle period of 80 seconds. A product of about 36 g was obtained, whose water and moisture resistance had improved compared with the product manufactured according to Example 2. In this example, the short urea formaldehyde chains react to each other and to the starch to create a three-dimensional network.

Now, the product was in particular longer resistant to hot liquids such as coffee; the firmness and form retention were maintained for a longer time. The recyclability in paper and the biodegradability were ensured.

The invention is by no means limited to the embodiments shown or described. Many variations thereto are possible. The freedom of design realized with the methods according to the invention is virtually unlimited. Thus, all kinds of other products can be manufactured with a method according to the invention, such as for instance trays for chips or snacks, edible containers such as ice-cream cups, sheet, bar and profiled material for all kinds of uses, plate-shaped or preformed construction material, and cups for cold and hot beverages, packagings for freezer and airplane meals, presentation material and like and many other, comparable products.

Through the use of relatively crude starting materials, particular advantages are realized, in particular also cost advantages, as the raw materials used will be cheaper than the materials that are commonly used at present. This means that with a method or apparatus according to the present invention, products can be made in an economical, competitive manner, in substitution for the relatively cheap products manufactured from plastic, paper, wood, metal or other materials, that are commonly used at present.

These and comparable variations are understood to fall within the scope of the invention.

What is claimed is:

1. A method for manufacturing molded bodies having a blown, foamy structure, said method comprising forming a mass comprising a suspension of at least starch, starch derivatives or mixtures thereof in water and heating in a manner such as to give rise to at least cross-linking of the starch, the starch derivatives or the mixture thereof, wherein the suspension is at least partially prepared from vegetable material which, calculated on a dry basis contains at least 50 wt. % of starch, said vegetable material at least being ground to particles of a suspendable size and not subjected to a drying or refining step between being ground and the heating step, characterized in that said mass is formed by pressurizing in a mold followed by heating in said mold in a manner such as to give rise to at least cross-linking of the starch, the starch derivatives or the mixture thereof and wherein said mass is brought at least to its baking temperature in the mold.

2. A method according to claim 1, further comprising adding to said mass at least one additive for improving the properties of the product to be molded, to obtain a homogeneous distribution of the additive in between and on the starch chains of said vegetable material.

3. A method according to claim 1, wherein the vegetable material is selected from the group consisting of potato, tapioca, maize, waxy maize and wheat.

4. A method according to claim 1, further comprising allowing said suspension to settle and to form supernatants, and at least partially removing said supernatants.

5. A method according to claim 1, wherein said vegetable material is ground substantially in the condition in which it is obtained in nature.

6. A method according to claim 1, wherein said vegetable material is substantially free of starch-starch interactions prior to being brought to at least the baking temperature in the mold.

7. A method for effecting a faster and more homogeneous gelatinization than when using a starch containing material that has been subjected to a drying step and/or a refined starch in a thermal molding process, said method comprising forming a mass comprising vegetable material which, calculated on a dry basis contains at least 50 wt % of starch, said vegetable material being ground to particles of suspendable size, and subjecting the mass to a thermal molding step under pressure, wherein said vegetable material is not subjected to a drying or refining step between being ground and the thermal molding step.

* * * * *